(12) United States Patent  
Gill et al.

(10) Patent No.: US 8,622,149 B2  
(45) Date of Patent: Jan. 7, 2014

(54) BALLISTIC TRANSFER DELAY DEVICE

(75) Inventors: Bennie C. Gill, Fulshear, TX (US);  
Steven W. Henderson, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 194 days.

(21) Appl. No.: 13/177,222

(22) Filed: Jul. 6, 2011

(65) Prior Publication Data

US 2012/0018157 A1  Jan. 26, 2012

Related U.S. Application Data

(60) Provisional application No. 61/361,555, filed on Jul. 6, 2010.

(51) Int. Cl.  
*E21B 43/116* (2006.01)

(52) U.S. Cl.  
USPC ............ 175/4.54; 166/297; 89/1.15; 102/204

(58) Field of Classification Search  
USPC ................. 175/4.54, 4.56; 166/297, 55, 55.1; 89/1.15; 102/200, 204  
See application file for complete search history.

(56) References Cited

U.S. PATENT DOCUMENTS

| | | |
|---|---|---|
| 3,209,692 A | 10/1965 | Webb |
| 4,614,156 A | 9/1986 | Colle, Jr. et al. |
| 4,653,400 A | 3/1987 | Crawford |
| 4,759,291 A | 7/1988 | Barker et al. |
| 5,007,344 A | 4/1991 | Ricles et al. |
| 5,062,485 A | 11/1991 | Wesson et al. |
| 5,078,210 A | 1/1992 | George |
| 5,123,356 A | 6/1992 | Brooks et al. |
| 5,386,780 A | 2/1995 | Klein |
| 5,505,134 A | 4/1996 | Brooks et al. |
| 6,675,896 B2 | 1/2004 | George |
| 7,546,805 B2 | 6/2009 | Voreck et al. |
| 8,002,026 B2 * | 8/2011 | Arrell et al. ............... 166/55.1 |
| 2002/0185276 A1 | 12/2002 | Muller et al. |
| 2010/0000789 A1 * | 1/2010 | Barton et al. .................. 175/2 |

OTHER PUBLICATIONS

International Search Report and Written Opinion of PCT Application No. PCT/US11/43081 dated Mar. 2, 2012.

* cited by examiner

*Primary Examiner* — William P Neuder  
(74) *Attorney, Agent, or Firm* — Jeffery R. Peterson; Brandon Clark

(57) ABSTRACT

A ballistic transfer delay device and method of use. The ballistic transfer delay device does not include a firing pin and it is not pressure initiated. The device comprises a time delay fuse, a through-bulkhead initiator to initiate the time delay fuse, and an output booster to ballistically transfer the energy from the initiated time delay fuse.

17 Claims, 2 Drawing Sheets

BALLISTIC TRANSFER DELAY DEVICE

RELATED APPLICATIONS

This application is a non-provisional application claiming the benefit of U.S. provisional application No. 61/361,555 filed on 6 Jul. 2010.

BACKGROUND

This section provides background information to facilitate a better understanding of the various aspects of the invention. It should be understood that the statements in this section of this document are to be read in this light, and not as admissions of prior art.

The invention relates generally to devices for use in detonating an explosive device and more specifically to a ballistic transfer delay device to introduce a time delay in a ballistic train.

Explosive charges are utilized in wellbores to perform various functions, for example, for perforating wells, for formation testing, to cut equipment, and to actuate devices such as bridge plugs, anchors, valves and packers. Heretofore, various time delay devices have been utilized to offset the time at which two or more explosive devices disposed in the well are detonated. For example, it is often desired to detonate multiple perforating gun sections to perforate the well casing and/or formation surrounding the wellbore. In particular, it is often desired to perforate different zones (i.e., sections) in a wellbore that are spaced a distance apart from one another. In these operations, a perforating gun may be run into the wellbore and the first zone perforated, the operator then pulls out of the wellbore and runs into the well with a second perforating gun to perforate the second wellbore zone. To eliminate multiple trips into the wellbore it is known to create extended length bottomhole assemblies ("BHA") that utilized blank spacer sections to separate the perforating gun sections. Drawbacks of this type of operation include increased time and expense to make-up the extended BHA length; the increased size of the BHA may require the use of larger surface drilling units (i.e., rigs, workover equipment) than desired or than is available; and the needed BHA length may exceed the length limitation for entering the wellbore through a lubricator.

To alleviate the use of extended length perforating gun assemblies, the spacer gun sections have been replaced with firing heads for each zone to be perforated, thus reducing the overall length and weight of the BHA. Each of the firing heads, for example hydraulic delay firing heads ("HDF"), can be initiated at the same time and the hydraulic time delay for the various HDFs is staggered using different coefficient orifices. When the delay of the first firing head expires a mechanical actuator (e.g., hydraulic piston, firing pin) impacts a detonator which fires for example into the input booster of the associated gun section. Upon firing of the first gun section, the BHA must be moved to the second perforation zone during the delay of the second firing head. This process repeats for the number of zones to be perforated. These operation require that the BHA be moved from zone to zone during the predetermined time delay of the respective firing heads, thus requiring that the delay time for each firing head and the cumulative delay times must be accurately calculated to achieve a successful operation. Pressure drops can occur from the time one gun section perforates and the next delay firing head operates. These pressure drops affect the delay time of all the unfired heads and must be compensated for when determining the detonation of the subsequent gun sections.

Another technique is the use of multiple hydraulic delay firing heads with ballistic delay charges. In these operations, the detonation of a first perforating gun (i.e., gun section) initiates the adjacent firing head causing a mechanical device (e.g., hydraulic piston, firing pin) to impact a detonator that ignites a delay fuse which burns and then transfers the burn to detonate the associated perforating gun section(s). The next delay firing head is initiated by the pressure of the detonated adjacent perforating gun, causing its firing pin to impact the detonator and ignite the delay fuse. The BHA is moved to the next wellbore zone during the time delay. These systems are pressure activated and require that the firing pins seal after activation of the firing pin to prevent pressure from above the particular firing head from communicating with the delay charge and gun (i.e., detonation cord and explosive charges) below the firing head. Communication of a pressure leak from above the firing head and delay charge can result in detonation of the gun off of the desired zone.

It is therefore a desire to provide a ballistic transfer delay device that can provide time delay in the ballistic transfer train. It is a further desire to provide a ballistic transfer delay device that does not have a firing pin. It is a still further desire to provide a ballistic transfer delay device that does not have a hydraulic firing mechanism. It is still a further desire to provide a ballistic transfer delay device that does not have a pressure requirement to be initiated.

SUMMARY

According to one or more embodiments of the invention, a ballistic transfer delay device comprises a time delay fuse, a through-bulkhead initiator to initiate the time delay fuse, and an output booster to ballistically transfer the energy from the initiated time delay fuse. According to one embodiment the output booster is a deflagration to detonation initiator. The through-bulkhead initiator is not pressure activated. The through-bulkhead initiator is ballistically initiated. According to at least one embodiment the time delay fuse, the through-bulkhead initiator, and the output booster do not comprise a moving element.

A wellbore apparatus according to one or more aspects of the invention comprises a firing head, a first and a second explosive device connected to the firing head within a ballistic train, and a ballistic transfer delay device connected within the ballistic train between the first explosive device and the second explosive device, wherein the ballistic transfer delay device comprises a time delay fuse, a through-bulkhead initiator to initiate the time delay fuse, and an output booster to ballistically transfer the energy from the initiated time delay fuse to the second explosive device. According to one embodiment of the invention the first and the second explosive devices are perforating guns.

In one embodiment the first explosive device comprises a detonation cord, an explosive charge connected to the detonation cord, and an output booster to ballistically transfer the detonation from the detonation cord to the through-bulk initiator. The first explosive device may be a perforating gun. According to at least one embodiment the ballistic transfer delay device does not comprise a firing pin, a moving part, and the through-bulkhead initiator is not pressure initiated.

An embodiment of a method for perforating comprises conveying a perforating apparatus to a position adjacent to a first zone in a wellbore, the perforating apparatus comprising a firing head, a first perforating gun and a second perforating gun connected to the firing head within a ballistic train, and a ballistic transfer delay device connected within the ballistic train between the first perforating gun and the second perforating gun, wherein the ballistic transfer delay device comprises a time delay fuse, a through-bulkhead initiator, and an output booster; detonating the first perforating gun in response to initiating the firing head; initiating the through-bulkhead initiator in response to ballistically transferring the detonation from the first gun to the through-bulkhead initiator; igniting the time delay fuse in response to initiating the through-bulkhead initiator; positioning the perforating apparatus adjacent to a second zone in the wellbore during a ballistic time delay associated with the ignited time delay fuse; and detonating the second perforating gun in response to ballistically transferring the energy from the time delay fuse to the second perforating gun.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
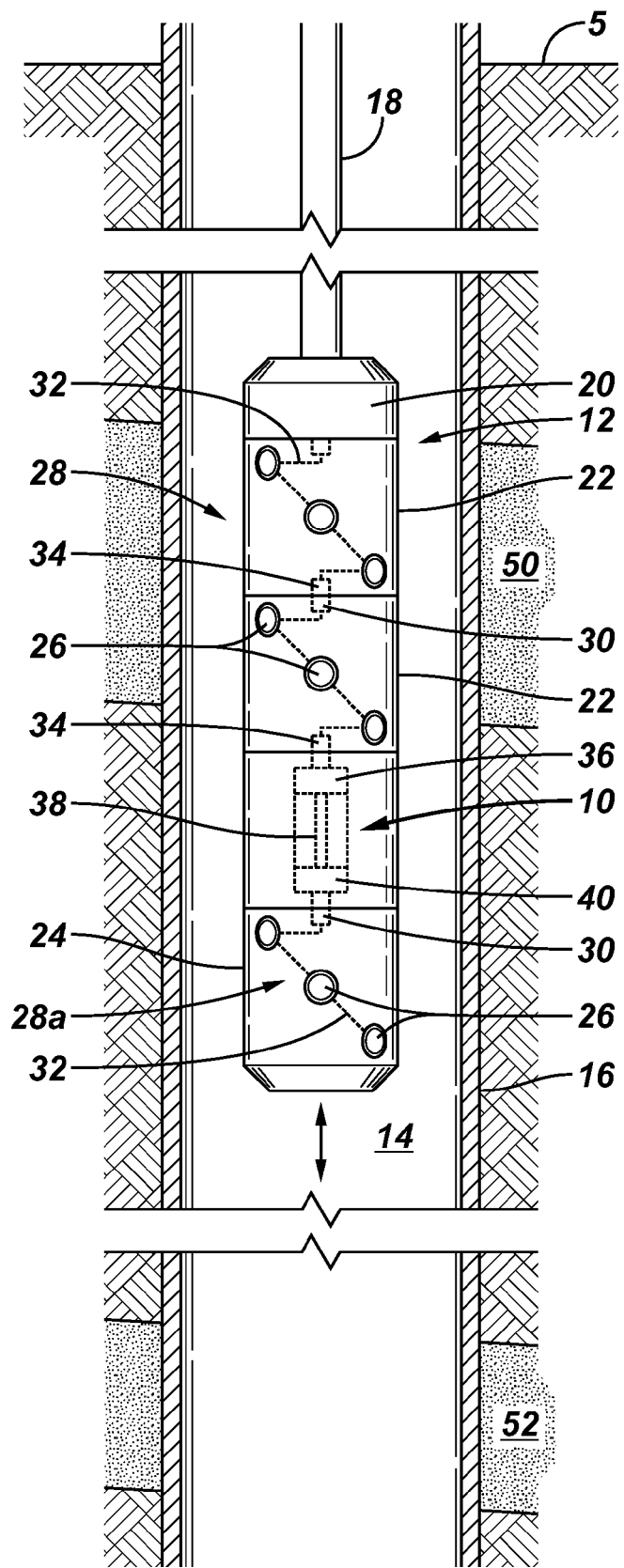
FIG. 1 illustrates a ballistic transfer delay device according to one or more aspects of the invention utilized in a wellbore tool string disposed in a wellbore.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth of the well being the lowest point, wherein the well (e.g., wellbore, borehole) is vertical, horizontal or slanted relative to the surface.

With reference to FIG. 1 a ballistic transfer delay device, generally denoted by the numeral 10, is shown incorporated into a wellbore tool string, or bottomhole assembly ("BHA"), 12. Depicted tool string 12 is a perforating apparatus, also referred to as a perforating gun. Ballistic transfer delay device 10 may be utilized in the ballistic train of devices other than perforating guns; however, for the purpose brevity and clarity, ballistic transfer delay device 10 is described with reference to perforating devices and operations.

Tool string 12 is positioned in a wellbore 14 which may or may not have casing 16 on a conveyance 18 (e.g., wireline, slickline, tubing, etc.). Tool string 12 comprises a firing head 20, one or more explosive devices 22, 24 connected to firing head 20 with a ballistic train 28, and ballistic transfer delay device 10 connected within ballistic train 28 between first explosive device 22 and second explosive device 24. With respect to a perforating apparatus, explosive devices 22, 24 are referred to as perforating guns 22, 24 or gun sections 22, 24. Depicted perforating apparatus 12 includes at least one first gun section 22 and at least one second gun section 24, wherein the first and second gun sections 22, 24 are separated by a ballistic transfer delay device 10 interconnected in ballistic train 28 of apparatus 12. As will be understood by those skilled in the art with benefit of this disclosure, apparatus 12 may include one or more ballistic transfer delay devices 10, and ballistic transfer delay device(s) 10 may be positioned in various locations within ballistic train 18 including immediately between firing head 20 and the adjacent explosive device.

Each gun section 22, 24 comprises at least one explosive charge 26. The ballistic train 28a of each of the depicted perforating gun sections 22, 24 can include an input, or receiver, booster 30, detonation cord 32, and at least one explosive charge 26. Gun section ballistic train 28a may also include an output booster 34. The perforating apparatus ballistic train 28 comprises each of the gun section ballistic trains 28a and the interconnected ballistic transfer delay device 10.

A sequence of operation of perforating apparatus 12 according to one embodiment of the invention is now described. In this example, the firing sequence is described as proceeding from the uppermost first gun section 22 relative to firing head 20 and the surface 5 to the lowermost second gun section 24. The firing sequence can be reversed as will be understood by those skilled in the art with benefit of this disclosure. That is, the firing sequence could be from the lowermost second gun section 24 to the uppermost first gun section 22 which is illustrated depicted adjacent to firing head 20. Perforating apparatus 12 is disposed in wellbore 14 and positioned with a first gun section 22 adjacent to a first zone 50 depicted as a subterranean formation. The only firing head 20 in perforating apparatus 12 is initiated and the detonation is transferred via detonation cord 32 to the uppermost first gun section 22 detonating the explosive charges 26 in the uppermost first gun section 22. A ballistic transfer from the uppermost first gun section 22 to the lower first gun section 22 is achieved by an output booster 34 to input booster 30 transfer. The ballistic transfer continues in the same manner detonating explosive charges 26 across the lower first gun section 22. At the bottom of the lower first gun section 22 a ballistic transfer occurs between the lower gun section 22 and ballistic transfer delay device 10. As will be further described below with reference to FIG. 2, an output booster 34 of the lower first gun section 22 initiates an input booster of a through-bulkhead initiator 36 which provides a ballistic transfer to a delay charge (i.e., fuse) 38 and a subsequent ballistic transfer (e.g., booster to booster) from the delay charge to the second gun section 24. The ballistic transfer across device 10 to second gun section 24 is delayed for a determined period of time, e.g., six seconds. During the ballistic transfer delay to second gun section 24, perforating apparatus 12 is moved to position second gun section 24 adjacent to a second perforation zone 52. Upon completion of the ballistic transfer delay, the explosive charges 26 of second gun section 24 are detonated in response to the ballistic transfer from device 10 to ballistic train 28a of second gun section 24. In this embodiment the second zone 52 is illustrated below the first zone 50 solely for the purpose of describing an example of operation. As will be understood by those skilled in the art with benefit of this disclosure, the subsequent perforation zone may be located above or below the prior perforated zone.

Figure 2:
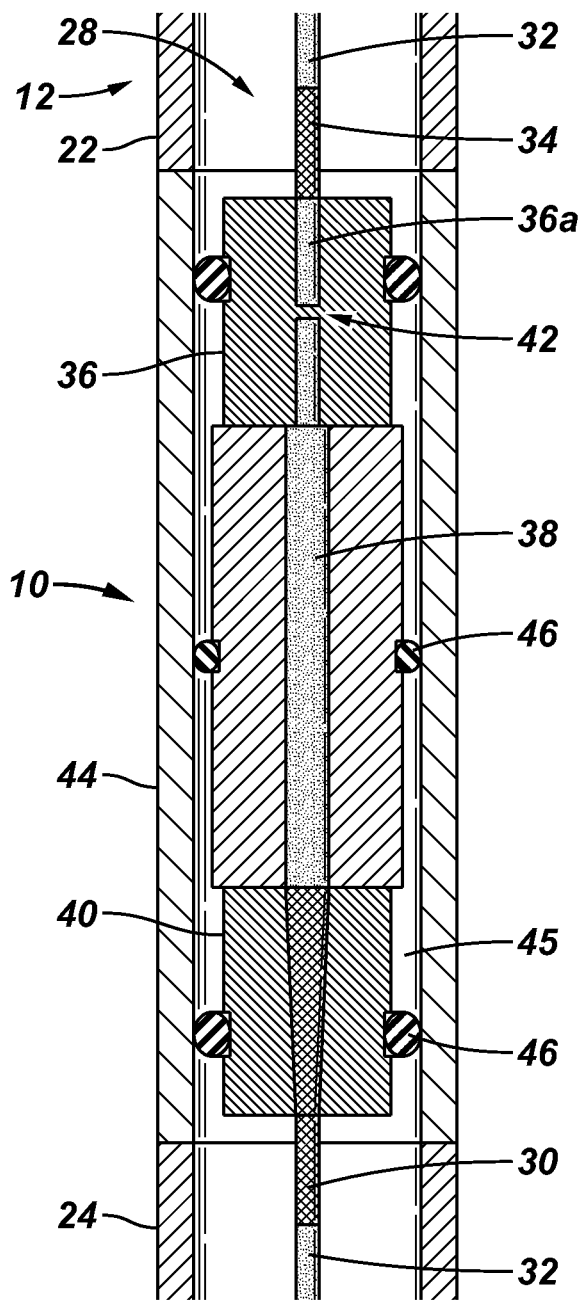
FIG. 2 is a schematic view of a ballistic transfer delay device according to one or more aspects of the invention disposed in a ballistic train of a wellbore tool string.

Referring now to FIG. 2, a ballistic transfer delay device 10 according to one or more aspects of the invention is schematically illustrated in a ballistic train 28 of a wellbore tool string 12. In this embodiment, ballistic transfer delay device 10 is depicted disposed in a housing 44, such as a gun carrier and/or loading tube. A pressure and/or fluid seal may be provided across the annulus 45 between housing 42 and ballistic transfer delay device 10 for example by o-rings 46. As further described below, a pressure barrier is maintained through the body ballistic transfer delay device 10 after it has been initiated.

The depicted embodiment of ballistic transfer delay device 10 comprises three different explosive devices with no hydraulic pistons, firing pins, or pressure requirements for activation. The three explosive devices comprise a through-bulkhead initiator ("TBI") 36; a delay pyrotechnic charge (e.g., fuse, time delay mix) 38, and an output booster 40 (e.g., deflagration to detonation initiator). TBI 36 isolates the pressure above, e.g., first explosive device 22, from delay charge 38 and second explosive device 24 below TBI 36. Through-bulkhead initiators can be obtained for example from *Pacific Scientific Energetic Materials Company* (www.psemc.com), and *PyroAlliance Groupe SNPE* (www.pyroalliance.com). Delay charge 38 burns giving the predetermined delay time between detonations of first explosive device 22 and second explosive device 24. The deflagration to detonation booster device 40 transfers the burn energy of delay charge 38 back to detonation and initiates second explosive device 24 via ignition of input booster 30.

According to one or more aspects of the invention, ballistic transfer delay device 10 does not use a hydraulic mechanism, a percussion initiator, or a mechanical percussion detonator. The elimination of mechanical initiation devices and initiation pressure requirements in ballistic transfer delay device 10 improves safety. Since ballistic transfer delay device 10 is ballistically initiated, the explosive devices (e.g., gun sections 22, 24) will not fire out of sequence or unpredictably. Embodiments of device 10 do not have moving parts and device 10 requires an explosion to be initiated.

A sequence of operation utilizing ballistic transfer delay device 10 in a ballistic train 28 of a perforating assembly 12 is now described with reference to FIGS. 1 and 2. Perforating assembly 12 is disposed in wellbore 14 on a conveyance 18 to position wherein a first gun section 22 is positioned adjacent a first perforation zone 50, 52. The only firing head 20 in perforating assembly 12 (i.e., BHA) is initiated and by use of detonating cord 32 the detonation is transferred to first perforating guns 22 detonating explosive charges 26. A ballistic transfer from the end of the first gun sections 22 to ballistic transfer delay device 10 is achieved by a booster to booster transfer. The first gun section 22 output booster 34 initiates an input booster 36a of TBI 36. Through-bulkhead initiator 36 facilitates a ballistic transfer without damaging a pressure barrier 42 that isolates the depicted first perforating gun section 22 from the delay charge 38 and second gun section 24. TBI 36 initiates delay charge 38. During the ballistic transfer time delay, perforating apparatus 12 is moved in wellbore positioning second gun section 24 adjacent to a second perforation zone 50, 52. Upon expiration of the ballistic transfer time delay, output booster 40 (e.g., deflagration to detonation initiator) transfers the energy of delay charge 38 to input booster 30 of second gun section 24, ballistically initiating second gun section 24 and detonating explosive charges 26 and perforation second zone 50, 52.

Ballistic transfer delay device 10 requires a detonation to be initiated. Device 10 cannot be prematurely detonated without an adjacent explosive device being detonated and a high order ballistic transfer taking place between the explosive device and TBI 36 and delay charge 38. Similarly a second gun section 24 associated with a ballistic transfer delay device 10 cannot be initiated with a first gun section being detonated adjacent to device 10 and a high order ballistic transfer (i.e., booster to booster) taking place between the first perforating gun section 22 and TBI 36, delay charge 38, and a ballistic transfer taking place across output booster 40 of device 10 and input booster 30 of second gun section 24. A single ballistic transfer delay device 10 can be utilized in an assembly 12 with one preset (i.e., designed) delay period, e.g., 1, 2, 3 . . . 6, or more minutes. Embodiments of the invention produce a safe, precise method for perforating multiple depths (i.e., zones 50, 52) with the shortest BHA 12 possible.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A ballistic transfer delay device, the device comprising:
 a time delay fuse;
 a through-bulkhead initiator to initiate the time delay fuse, wherein the time delay fuse, the through-bulkhead initiator, and the output booster do not comprise a moving element; and
 an output booster to ballistically transfer the energy from the initiated time delay fuse.

2. The device of claim 1, wherein the output booster is a deflagration to detonation initiator.

3. The device of claim 1, wherein the through-bulkhead initiator is not pressure activated.

4. The device of claim 1, wherein the through-bulkhead initiator is ballistically initiated.

5. The device of claim 1, wherein the output booster is a deflagration to detonation initiator.

6. The device of claim 1, wherein the through-bulkhead initiator is not pressure activated.

7. A wellbore apparatus, the apparatus comprising:
 a firing head;

a first and a second explosive device connected to the firing head within a ballistic train; and a ballistic transfer delay device connected within the ballistic train between the first explosive device and the second explosive device, wherein the ballistic transfer delay device comprises a time delay fuse, a through-bulkhead initiator to initiate the time delay fuse, and an output booster to ballistically transfer the energy from the initiated time delay fuse to the second explosive device, wherein the ballistic transfer delay device does not comprise a moving part.

8. The apparatus of claim 7, wherein the first and the second explosive devices are perforating guns.

9. The apparatus of claim 7, wherein the first explosive device comprises a detonation cord, an explosive charge connected to the detonation cord, and an output booster to ballistically transfer the detonation from the detonation cord to the through-bulk initiator.

10. The apparatus of claim 7, wherein the ballistic transfer delay device does not comprise a firing pin.

11. The apparatus of claim 7, the ballistic transfer delay device is not pressure initiated.

12. The apparatus of claim 7, wherein the output booster is a deflagration to detonation initiator.

13. The apparatus of claim 7, wherein:
the ballistic transfer delay device does not comprise a firing pin;
and
the through-bulkhead initiator is not pressure initiated.

14. The apparatus of claim 13, wherein the first explosive device comprises a detonation cord, an explosive charge connected to the detonation cord, and an output booster to ballistically transfer the detonation from the detonation cord to the through-bulk initiator.

15. A method for perforating, comprising:
conveying a perforating apparatus to a position adjacent to a first zone in a wellbore, the perforating apparatus comprising a firing head, a first perforating gun and a second perforating gun connected to the firing head within a ballistic train, and a ballistic transfer delay device connected within the ballistic train between the first perforating gun and the second perforating gun, wherein the ballistic transfer delay device comprises a time delay fuse, a through-bulkhead initiator, and an output booster, wherein the ballistic transfer delay device does not comprise a moving part;

detonating the first perforating gun in response to initiating the firing head;

initiating the through-bulkhead initiator in response to ballistically transferring the detonation from the first gun to the through-bulkhead initiator;

igniting the time delay fuse in response to initiating the through-bulkhead initiator;

positioning the perforating apparatus adjacent to a second zone in the wellbore during a ballistic time delay associated with the ignited time delay fuse; and detonating the second perforating gun in response to ballistically transferring the energy from the time delay fuse to the second perforating gun.

16. The method of claim 15, wherein:

the ballistic transfer delay device does not comprise a firing pin;

and the through-bulkhead initiator is not pressure initiated.

17. The method of claim 15, wherein:

the first perforating gun comprises a detonation cord, an explosive charge connected to the detonation cord, and an output booster; and the ballistically transferring the detonation from the first gun to the through-bulkhead initiator comprises transferring the detonation from the output booster to an input booster of the through-bulkhead initiator.

* * * * *